United States Patent [19]
Weiss

[11] Patent Number: 6,014,562
[45] Date of Patent: Jan. 11, 2000

[54] RADIOTELEPHONE COMMUNICATION SYSTEMS AND METHODS THAT MAP AN ACCESS REQUEST INTO A PREDETERMINED RANDOM ACCESS CHANNEL SLOT TO IDENTIFY A NEAREST GATEWAY TO A RADIOTELEPHONE

[75] Inventor: Richard Edward Weiss, Cary, N.C.

[73] Assignee: Ericsson Inc., Research Triangle Park, N.C.

[21] Appl. No.: 09/081,129

[22] Filed: May 19, 1998

[51] Int. Cl.[7] ................................................. H04B 7/185
[52] U.S. Cl. ........................... 455/427; 370/337; 370/347
[58] Field of Search .................................... 455/427, 510, 455/450, 428, 403, 422, 426, 500; 370/335, 337, 346, 329, 348, 438

[56] References Cited

U.S. PATENT DOCUMENTS

| | | | |
|---|---|---|---|
| 5,276,911 | 1/1994 | Levine et al. | 455/510 |
| 5,521,925 | 5/1996 | Merakos et al. | 370/337 |
| 5,701,298 | 12/1997 | Diachina et al. | 370/346 |
| 5,850,392 | 12/1998 | Wang et al. | 370/335 |
| 5,887,257 | 3/1999 | Olds | 455/427 |
| 5,918,174 | 6/1999 | Chennakeshu et al. | 455/427 |
| 5,924,034 | 1/1999 | Dupuy | 455/440 |

FOREIGN PATENT DOCUMENTS

WO 97/38502 10/1997 WIPO.

OTHER PUBLICATIONS

International Search Report, PCT/US99/08224, Aug. 5, 1999.

Mouly et al., "*The GSM System for Mobile Communications*", 1992, pp. 368–372.

"*Satellite Air Interface Specifiction for the Asia Cellular Satellite System*", Jan. 1998, Document No. PS–SAI13100 Rev. C, copyright 1996, 1997, 1998, Lockheed Martin Corporation, PT Asia Cellular Satellite and Ericsson Mobile Communications AB, pp. 30, 65 and 149–152.

*Primary Examiner*—Wellington Chin
*Assistant Examiner*—Congvan Tran
*Attorney, Agent, or Firm*—Myers Bigel Sibley & Sajovec

[57] ABSTRACT

An access request by a radiotelephone for one of a plurality of radiotelephone traffic channels is mapped into a predetermined one of a repeating series of Random Access CHannel (RACH) slots, based upon information concerning the access request by the radiotelephone. Accordingly, the RACH slot in which the access request is placed, conveys additional information about the access request. This additional information can be conveyed and decoded without the need to modify the RACH protocol or to extend the length of the RACH slots.

33 Claims, 8 Drawing Sheets

RADIOTELEPHONE COMMUNICATION SYSTEMS AND METHODS THAT MAP AN ACCESS REQUEST INTO A PREDETERMINED RANDOM ACCESS CHANNEL SLOT TO IDENTIFY A NEAREST GATEWAY TO A RADIOTELEPHONE

FIELD OF THE INVENTION

This invention relates to communications systems and methods, in particular, to radiotelephone communication systems and methods.

BACKGROUND OF THE INVENTION

Cellular radiotelephone systems are commonly employed to provide voice and data communications to a plurality of subscribers. For example, analog cellular radiotelephone systems, such as designated AMPS, ETACS, NMT-450, and NMT-900, have been deployed successfully throughout the world. More recently, digital cellular radiotelephone systems such as designated IS-54B in North America and the pan-European GSM system have been introduced. These systems, and others, are described, for example, in the book titled *Cellular Radio Systems* by Balston, et al., published by Artech House, Norwood, Mass., 1993.

Figure 1:
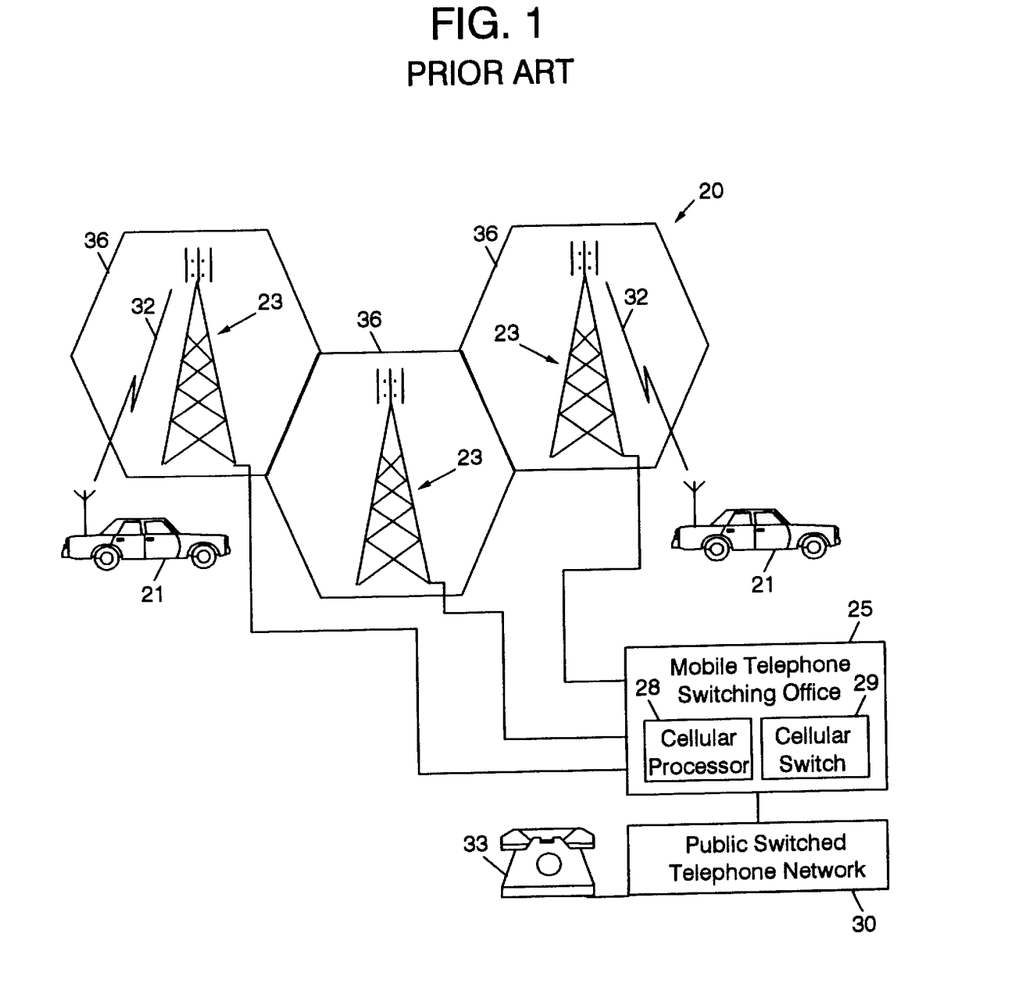
FIG. 1 illustrates conventional terrestrial cellular radiotelephone communication systems.

FIG. 1 illustrates a conventional terrestrial cellular radiotelephone communication system 20. The cellular radiotelephone system may include one or more radiotelephones 21, communicating with a plurality of cells 36 served by base stations 23 and a mobile telephone switching office (MTSO) 25. Although only three cells 36 are shown in FIG. 1, a typical cellular network may comprise hundreds of cells, may include more than one MTSO, and may serve thousands of radiotelephones.

The cells 36 generally serve as nodes in the communications system 20, from which links are established between radiotelephones 21 and the MTSO 25, by way of the base stations 23 serving the cells 36. Each cell will have allocated to it one or more dedicated control channels and one or more traffic channels. The control channel is a dedicated channel used for transmitting cell identification and paging information. The traffic channels carry the voice and data information. Through the cellular network 20, a duplex radio communication link 32 may be effected between two mobile stations 21 or between a radiotelephone 21 and a landline telephone user 33. The function of the base station 23 is commonly to handle the radio communication between the cell and the mobile station 21. In this capacity, the base station 23 functions chiefly as a relay station for data and voice signals.

Figure 2:
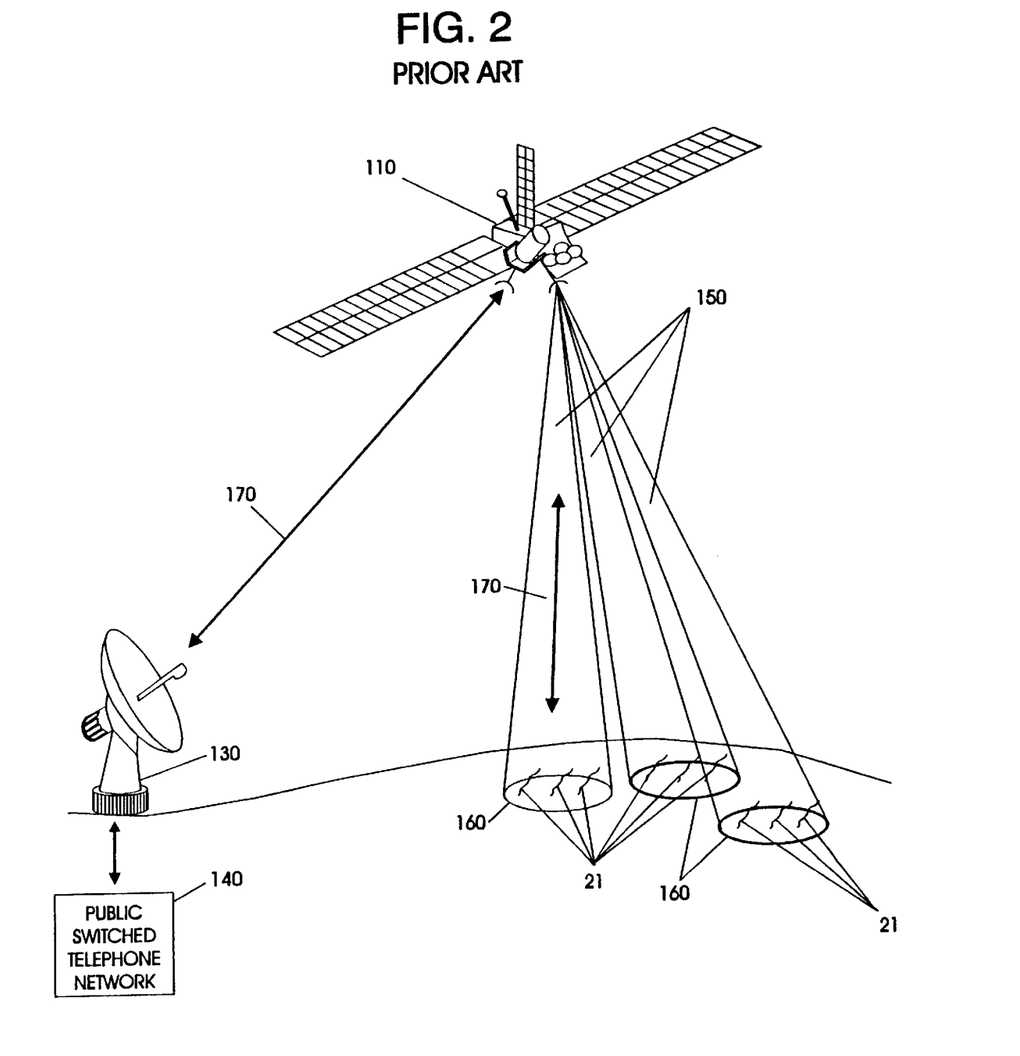
FIG. 2 illustrates conventional satellite radiotelephone communication systems.

As illustrated in FIG. 2, satellites 110 may be employed to perform similar functions to those performed by base stations in a conventional terrestrial radiotelephone system, for example, in areas where population is sparsely distributed over large areas or where rugged topography tends to make conventional landline telephone or terrestrial cellular telephone infrastructure technically or economically impractical. A satellite radiotelephone system typically includes one or more satellites 110 which serve as relays or transponders between one or more earth stations 130 and radiotelephones 21. The satellite communicates with radiotelephones 21 and earth stations 130 over duplex links 170. The earth station may in turn be connected to a public switched telephone network 140, allowing communications between satellite radiotelephones, and communications between satellite radio telephones and conventional terrestrial cellular radiotelephones or landline telephones. The satellite radiotelephone system may utilize a single antenna beam covering the entire area served by the system, or, as shown, the satellite may be designed such that it produces multiple minimally-overlapping beams 150, each serving distinct geographical coverage areas 160 in the system's service region. A satellite 110 and coverage area 160 serve functions similar to that of a base station 23 and cell 36, respectively, in a terrestrial cellular system.

Traditional analog radiotelephone systems generally employ a system referred to as frequency division multiple access (FDMA) to create communications channels. As a practical matter well-known to those skilled in the art, radiotelephone communication signals, being modulated waveforms, typically are communicated over predetermined frequency bands in a spectrum of carrier frequencies. These discrete frequency bands serve as traffic channels over which cellular radiotelephones communicate with a cell, through the base station or satellite serving the cell. In the United States, for example, Federal authorities have allocated to cellular communications a block of the UHF frequency spectrum further subdivided into pairs of narrow frequency bands, a system designated EIA-553 or IS-19B. Channel pairing results from the frequency duplex arrangement wherein the transmit and receive frequencies in each pair are offset by 45 Mhz. At present there are 832, 30-Khz wide, radio channels allocated to cellular mobile communications in the United States.

The limitations on the number of available frequency bands may present several challenges as the number of subscribers increases. Increasing the number of subscribers in a cellular radiotelephone system may require more efficient utilization of the limited available frequency spectrum in order to provide more total channels while maintaining communications quality. This challenge is heightened because subscribers may not be uniformly distributed among cells in the system. More channels may be needed for particular cells to handle potentially higher local subscriber densities at any given time. For example, a cell in an urban area might conceivably contain hundreds or thousands of subscribers at any one time, easily exhausting the number of frequency bands available in the cell.

For these reasons, conventional cellular systems employ frequency reuse to increase potential channel capacity in each cell and increase spectral efficiency. Frequency reuse involves allocating frequency bands to each cell, with cells employing the same frequencies geographically separated to allow radiotelephones in different cells to simultaneously use the same frequency without interfering with each other. By so doing, many thousands of subscribers may be served by a system of only several hundred frequency bands.

Figure 3:
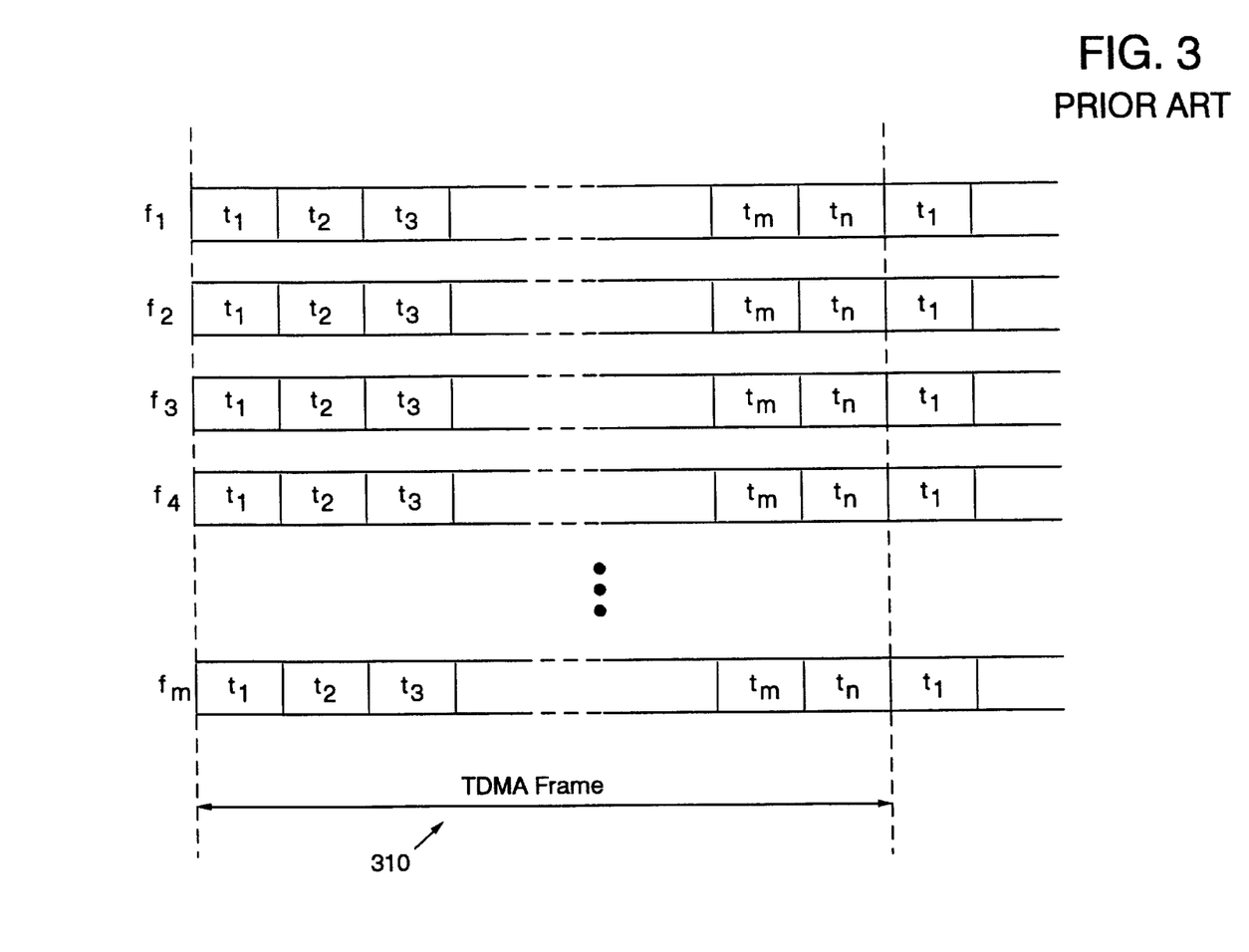
FIG. 3 illustrates conventional allocation of carrier frequency spectrum for radiotelephone communication systems.

Another technique which may further increase channel capacity and spectral efficiency is time division multiple access (TDMA). A TDMA system may be implemented by subdividing the frequency bands employed in conventional FDMA systems into sequential time slots, as illustrated in FIG. 3. Although communication on frequency bands $f_1-f_m$ typically occur on a common TDMA frame 310 that includes a plurality of time slots $t_1-t_n$ as shown, communications on each frequency band may occur according to a unique TDMA frame, with time slots unique to that band. Examples of systems employing TDMA are the dual analog/digital IS-54B standard employed in the United States, in which each of the original frequency bands of EIA-553 is subdivided into 3 time slots, and the European GSM standard, which divides each of its frequency bands into 8 time slots. In these TDMA systems, each user communicates with the base station using bursts of digital data transmitted during the user's assigned time slots. A channel in a TDMA system typically includes one or more time slots on one or more frequency bands.

Because it generally would be inefficient to permanently assign TDMA time slots to a radiotelephone, typical radiotelephone systems assign time slots on an as needed basis to more efficiently use the limited carrier frequency spectrum available to the system. Therefore, a task in radiotelephone communication is providing a radiotelephone with access to the system, i.e., assigning time slots corresponding to a traffic (voice or data) channel to a radiotelephone when it desires to communicate with another radiotelephone or with a landline telephone or conventional cellular radiotelephone via the PSTN. This task is generally encountered both when a radiotelephone attempts to place a call and when a radiotelephone attempts to respond to a page from another radiotelephone or conventional telephone.

Access to a radiotelephone communication system may be provided in a number of ways. For example, a polling technique may be utilized whereby a central or base station serially polls users, giving each an opportunity to request access in an orderly fashion, without contention. However, serial polling may be impractical for radiotelephone systems because typical radiotelephone systems may have hundreds, if not thousands, of users. Those skilled in the art will appreciate that serially polling this many users may be extremely inefficient, especially when one considers that many of the users may not desire access at all, or may not desire access at the particular moment they are polled.

For this reason, radiotelephone systems typically use random access techniques, whereby a radiotelephone desiring a traffic channel randomly sends an access request to the base or hub station, which the base station acknowledges by establishing a communications channel to the requesting radiotelephone, if available. An example of a random access technique for a TDMA radiotelephone communication system is that used in the GSM system. In the GSM system, a set of Common Control Channels (CCCHs) is shared by radiotelephones in the system and includes one or more Random Access CHannels (RACH).

Figure 4A:
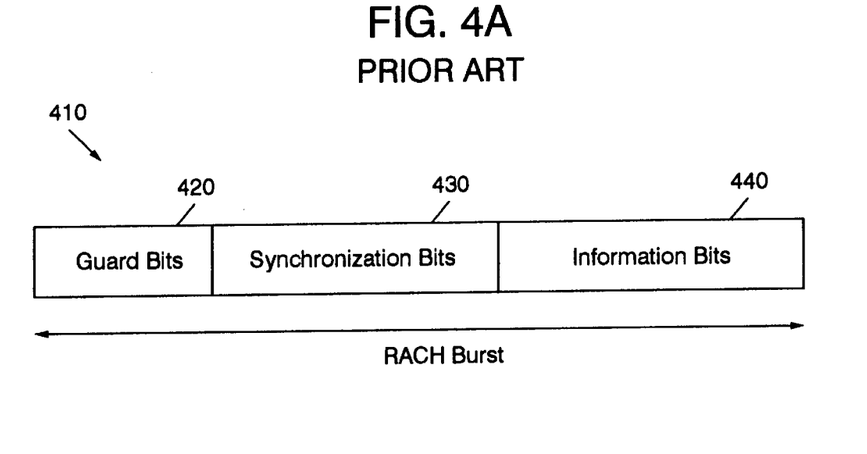
FIGS. 4A–4B illustrate time slots and frames utilized in conventional TDMA radiotelephone communication systems.
Figure 4B:
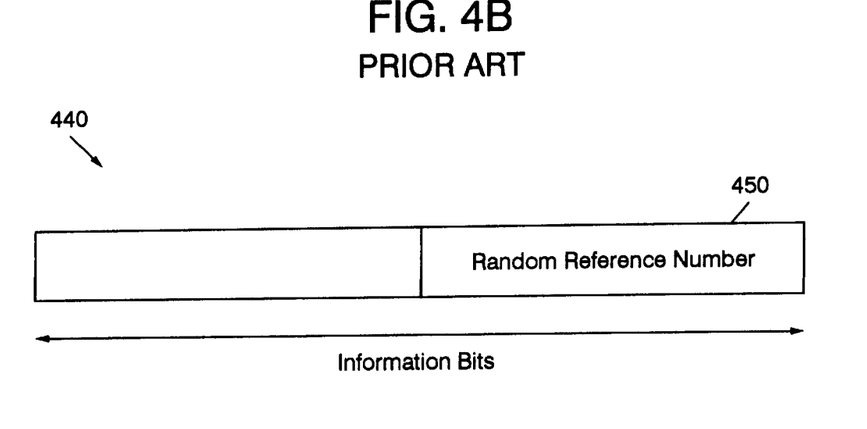

Radiotelephones typically monitor the status of the RACH to determine whether other radiotelephones are currently requesting access. If a radiotelephone desires access and senses that the RACH is idle, the radiotelephone typically transmits a random access channel signal, typically including the radiotelephone's identification and an identification of the telephone the radiotelephone desires to contact, in what is often referred to as a "RACH burst." As illustrated in FIGS. 4A and 4B, a RACH burst 410 typically contains several fields, including a plurality of guard bits 420, a sequence of synchronization bits 430, and a sequence of information bits 440. The guard bits 420 are used to prevent overlap of communications occurring on adjacent time slots. The synchronization sequence 430 is used by the receiving station to synchronize with the RACH burst, in order to decode the information contained in the information sequence 440. The information sequence 440 may also include a number of sub-fields, for example, a random reference number field 450 which serves as a "tag" for identifying a particular random access request from a particular radiotelephone.

In a GSM system, a RACH is a dedicated TDMA time slot on a carrier frequency band, used by radiotelephones to request access to the communications system. Radiotelephones typically time their RACH bursts to fall within an assigned TDMA time slot for the RACH, for example, by waiting a predetermined period after a transition in a synchronization signal transmitted by the base station and then transmitting the RACH burst. However, because radiotelephones conventionally use a common TDMA time slot for transmitting RACH burst, there is a possibility of collisions between access requests which are transmitted simultaneously or nearly simultaneously by neighboring radiotelephones. To deal with these collisions, the base station may implement some form of contention-resolving protocol. For example, the base station may refuse to acknowledge simultaneous requests, requiring a requesting radiotelephone to reassert its request if it continues to desire access after failing to establish a channel. Contention-resolving protocols may also use a variety of random delays and similar techniques to reduce the likelihood of radiotelephones engaging in repeated collisions subsequent to a first collision. Contention logic used in the European GSM system is described in *The GSM System for Mobile Communications* published by M. Mouly and M. B. Pautet, 1992, at pages 368–72.

As the complexity of a radiotelephone communication system increases, it may be desirable to provide additional information to a radiotelephone communication system, as part of the RACH message. For example, in a satellite radiotelephone system, as described in FIG. 2, the RACH message may be designed to allow the radiotelephone to transmit the National Country Code (NCC) and the Destination Code for the called number in a radiotelephone originated call. This information may be generally sufficient to efficiently route radiotelephone-originated calls through the radiotelephone system ground stations and network.

However, there may be cases where this information may not be sufficient in order to route the call efficiently. For example, more than one gateway 130 may be provided in a particular country. It may be desirable to route the radiotelephone originated call from the satellite through the gateway that is closest to the radiotelephone. Unfortunately, the RACH message protocol may not provide a field to use in providing this additional information.

Additional information may be provided by redesigning the protocol for the RACH message, to allow encoding of the additional information. Thus, for example, the information content of the RACH message can be increased to include identification of the nearest gateway. Unfortunately, modification of the RACH protocols may require modification of both layer 1 (physical) and layer 3 (signaling) protocols. This may be difficult to implement in radiotelephone communication, in which protocols have already been standardized. Moreover, modification of these protocols may impact the backward compatibility with existing radiotelephones. Finally, if the RACH message is increased in length, additional delay may be produced in obtaining access to the radiotelephone communication system. Accordingly, there is a need to provide additional information within a RACH message, without requiring modification of the RACH message protocol, and without requiring expansion of the RACH slot length.

SUMMARY OF THE INVENTION

It is therefore an object of the present invention to provide improved radiotelephone communication systems, methods, radiotelephones and base stations.

It is another object of the present invention to provide improved systems, methods, radiotelephones and base stations that access radiotelephone traffic channels.

It is still another object of the present invention to provide additional information in a RACH message, without requiring redesign of the protocol of the RACH message and without requiring an increase in the length of the RACH slot.

These and other objects are provided according to the present invention by mapping an access request by a radiotelephone for one of a plurality of radiotelephone traffic channels, into a predetermined one of a repeating series of Random Access CHannel (RACH) slots, based upon information concerning the access request by the radiotelephone. Accordingly, the RACH slot in which the access request is placed, conveys additional information about the access request. This additional information can be conveyed and decoded in a base station without the need to modify the RACH protocol or to extend the length of the RACH slots.

More specifically, according to the present invention, a radiotelephone communication system includes a plurality of radiotelephones and at least one base station. A plurality of radiotelephone traffic channels are used by the radiotelephones for radiotelephone communication via the at least one base station. A RACH including repeating frames of RACH slots is used by the radiotelephones to request access to one of the radiotelephone traffic channels by placing an access request message in a RACH slot. An access request by a radiotelephone is mapped into a predetermined one of the RACH slots, based upon information concerning the access request by the radiotelephone, such that the RACH slot in which an access request is placed conveys additional information about the access request. The base station decodes the additional information about the access request based upon identification of the RACH slot in which the access request message is received.

In an embodiment of the present invention, the radiotelephone communication is a satellite radiotelephone communication system including at least one satellite. A plurality of gateways is provided. In this embodiment, an access request by a radiotelephone is mapped into a predetermined one of the RACH slots based upon the nearest gateway to the radiotelephone, such that the RACH slot in which an access request is received identifies the nearest gateway to the radiotelephone.

For example, the satellite radiotelephone communication system may include first and second gateways. The repeating frames of RACH slots are repeating frames of odd and even RACH slots. An access request by a radiotelephone is mapped into an odd RACH slot, to indicate that the first gateway is nearest to the radiotelephone. An access request by the radiotelephone is mapped into an even RACH slot to indicate that the second gateway is nearest to the radiotelephone. Accordingly, rather than randomly placing a RACH message in an available RACH slot as is conventional, the particular slot in which the RACH message is placed is chosen to convey additional information about the access request.

The present invention is compatible with contention-resolving protocols. For example, in a contention-resolving protocol, if two radiotelephones request access in the same RACH slot, a random number generator in each radiotelephone may randomly indicate a selected frame in which each radiotelephone will repeat the access request. According to the invention, an access request by the radiotelephone is then mapped into a predetermined one of the RACH slots in the selected frame of RACH slots that was indicated by the random number generator. Accordingly, the RACH slot in which an access request is placed conveys additional information about the access request, while still allowing conflict-resolution with multiple access requests in the same RACH slot.

It will be understood by those having skill in the art that the present invention may be provided by radiotelephone communication systems and methods by radiotelephones and methods of operating radiotelephones and by base stations and methods of operating base stations. Additional information may be provided concerning an access request, without requiring modification of the RACH protocol or lengthening of the RACH frame.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention will now be described in connection with a satellite radiotelephone communication system that includes two gateways wherein it is desirable to communicate the identity of the nearest gateway in a RACH message. However, it will be understood that the present invention may be used with other radiotelephone communication systems, including but not limited to cellular and satellite radiotelephone communication systems. It will also be understood that the information that is conveyed by mapping an access request by a radiotelephone into a predetermined one of the RACH slots may be information other than the identity of the nearest gateway. Finally, it will also be understood by those having skill in the art that the term "radiotelephone" is used to cover analog and digital radiotelephones, multiple mode radiotelephones and high function Personal Communications Systems (PCS) devices that may include large displays, scanners, full-size keyboards and the like.

Figure 5:
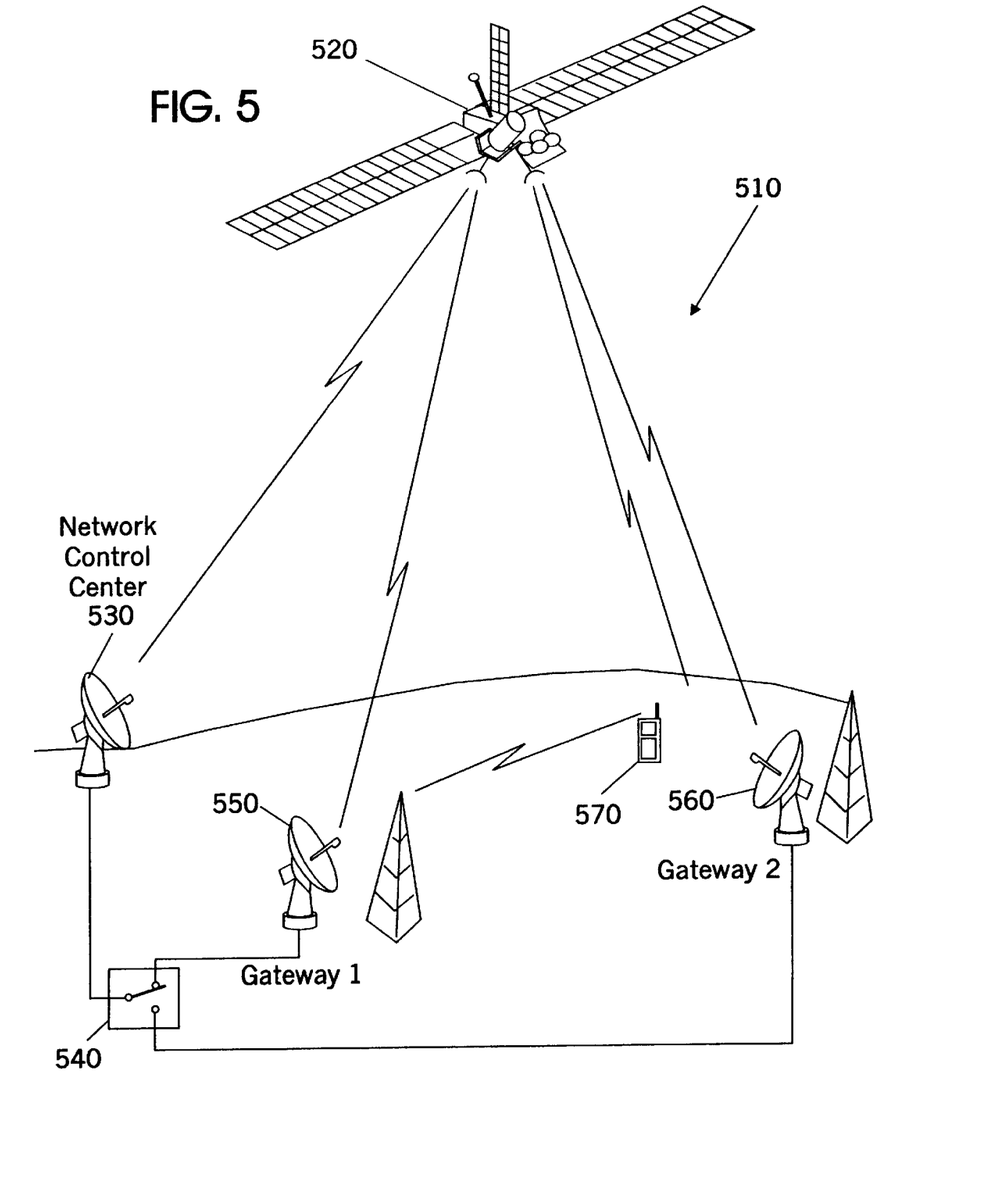
FIG. 5 illustrates satellite radiotelephone communication systems according to the present invention.

Referring now to FIG. 5, a satellite radiotelephone communication system 510 includes at least one satellite 520, a network control center 530, and a plurality of gateways 550 and 560. It will be understood by those having skill in the art that although one satellite 520, one network control center 530 and two gateways 550 and 560 are shown, a satellite radiotelephone communication system 510 may include many more satellites, network control centers and gateways.

Still referring to FIG. 5, in sending RACH signals via the downlink, the system transmits data from the satellite 520 to the network control signal center 530, which in turn relays the RACH information to the first gateway 550 or the second gateway 560 using switch 540. From a cost standpoint, and/or from a network loading standpoint, it may be desirable to route the call from the satellite 520 through the gateway that is closest to the radiotelephone 570. As shown in FIG. 5, the first gateway 550 is closer to radiotelephone 570 than the second gateway 560. Unfortunately, standard satellite air interface specifications for satellite radiotelephone communication systems 510 that include multiple gateways, may not include a provision within the RACH protocol to provide an identification of the nearest gateway to the radiotelephone that is requesting access. See for example, the Satellite Air Interface Specification for the Asia Cellular Satellite System, January 1998, Document No. PS-SAI13100 Rev. C, copyright 1996, 1997, 1998, Lockheed Martin Corporation, PT Asia Cellular Satellite and Ericsson Mobile Communications AB, pp. 30, 65 and 149–152, the disclosure of which is hereby incorporated herein by reference.

The RACH protocol in the Satellite Air Interface Specification can be modified to include an identification of the nearest gateway. However, this modification may impact compatibility with existing radiotelephones, and may also increase the length of the RACH message, thereby increasing access delays.

According to the invention, an identification of the nearest gateway may be provided by mapping an access request by a radiotelephone into a predetermined one of the RACH slots, based upon the nearest gateway to the radiotelephone, such that the RACH slot in which an access request is placed identifies the nearest gateway to the radiotelephone.

Figure 6:
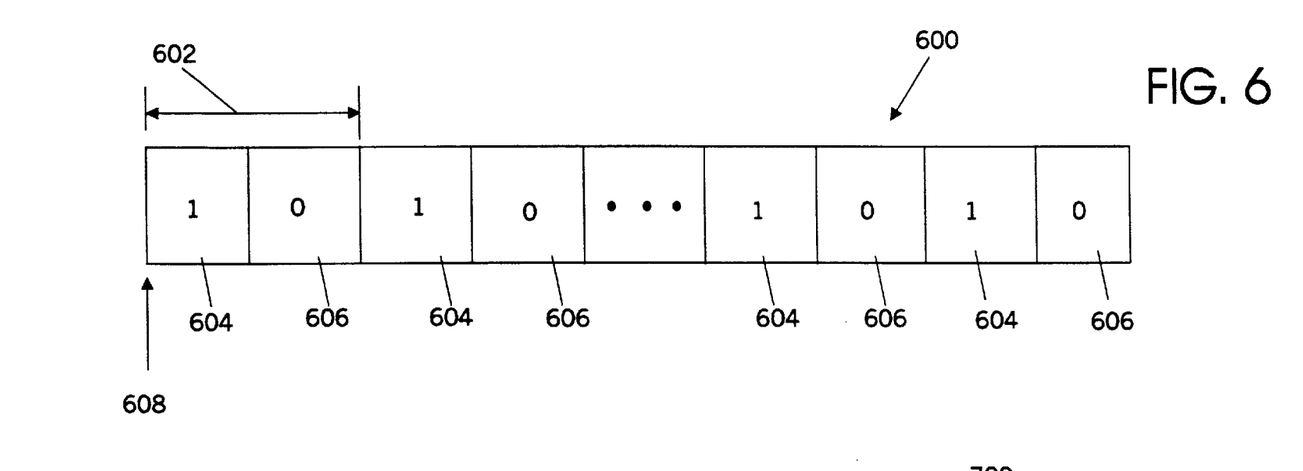
FIGS. 6 and 7 illustrate mapping into a RACH slot according to the present invention.

Referring now to FIG. 6, mapping into a RACH slot according to the invention will now be illustrated. As shown in FIG. 6, a RACH 600 includes repeating frames 602 of RACH slots 604 and 606 that are used by the radiotelephones 570 to request access to one of the radiotelephone traffic channels by placing an access request message in a RACH slot. In FIG. 6, the RACH 600 is illustrated as a unique control channel. However, it will be understood by those having skill in the art that the RACH channel 600 can be interleaved with other control channels and/or traffic channels.

In FIG. 6, the RACH frame 600 includes two RACH slots 604, 606. According to the invention, an access request by a radiotelephone 570 is mapped into a predetermined one of the RACH slots 604 or 606, based upon the nearest gateway to the radiotelephone 570, such that the RACH slot 604 or 606 in which an access request is placed identifies a nearest gateway to the radiotelephone. For example, the odd RACH slots 604 may be used to indicate that the first gateway 550 is nearest to the radiotelephone 570. The even RACH slots 606 may be used to indicate that the second gateway 560 is nearest to the radiotelephone 570.

Thus, referring to FIGS. 5 and 6, in order to indicate that radiotelephone 570 is nearest gateway 550, a RACH message is mapped into odd RACH slot 604 rather than using a random mapping into the next available RACH slot. The network control center 530 uses the information concerning which time slot a RACH message was received to control switch 540 to switch the message to the first gateway 550.

It will be understood by those having skill in the art that in order to define the odd and even slots 604 and 606, a known starting point, referred to as an Absolute Frame Number (AFN) 608 is identified to both the radiotelephone and the network control center. In FIG. 6, the alternating RACH slots may be identified as odd or even, 1 or 0, A or B, or any other identification. The slots of one phase can be mapped to first gateway, and those of the other phase to second gateway. Accordingly, the network control center 530 can route the RACH messages to the nearest gateway based on the time slot in which the information arrives relative to the known AFN 608.

Figure 7:
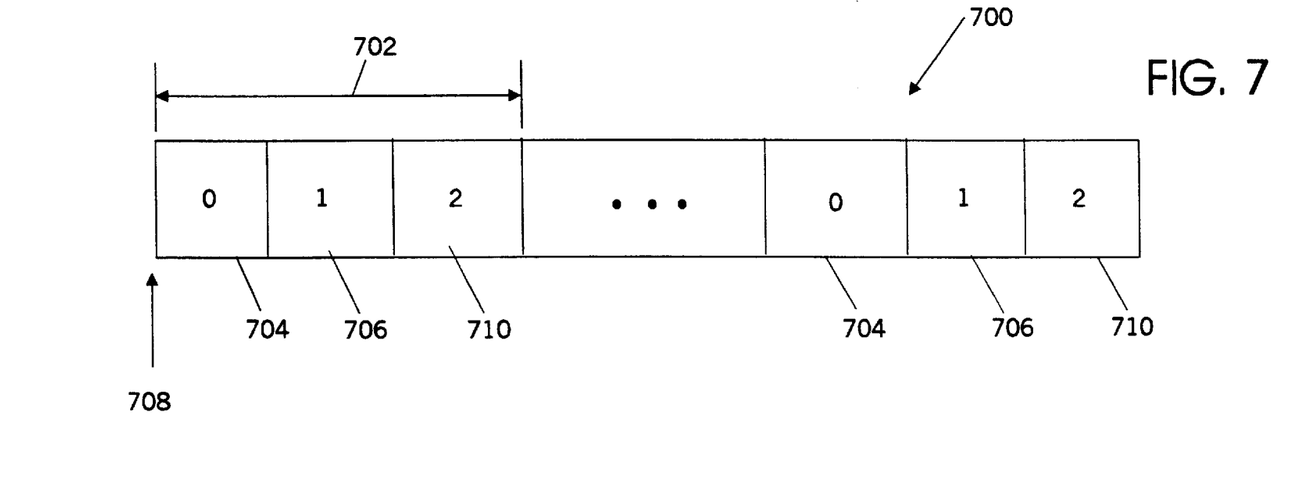

FIG. 7 illustrates a RACH 700 having a RACH frame 702 with three slots 704, 706, 710, and an AFN 708. RACH 700 may be used to route a RACH access request to one of three gateways. Alternatively, the RACH mapping may be used to provide other information in addition to or separate from the nearest gateway identification.

RACHs 600 and 700 may be generalized to any AFN modulo N and any number of defined slot positions M. In FIG. 6, M is equal to 2, and in FIG. 7 M is equal to 3. Accordingly, the RACH slot in which an access request is placed conveys additional information about the access request, without the need to change the access protocol or to lengthen the RACH frame.

The present invention is also compatible with contention-resolving protocols that are used to reduce the likelihood that a second access request by two radiotelephones will also take place in the same RACH slot. In such contention-resolving schemes, a random number generator may be used to randomly delay the second access request by a number of RACH frames that is determined by the random number. Accordingly, when two radiotelephones generate an access request in the same RACH slot, each telephone may generate a random number to determine the subsequent RACH frame in which the access request will be retransmitted. In the subsequent frame, the above-described mapping is used to map an access request into a predetermined one of the RACH slots in the frame of RACH slots indicated by the random number generator, based upon information concerning the access request by the radiotelephone.

Figure 8:
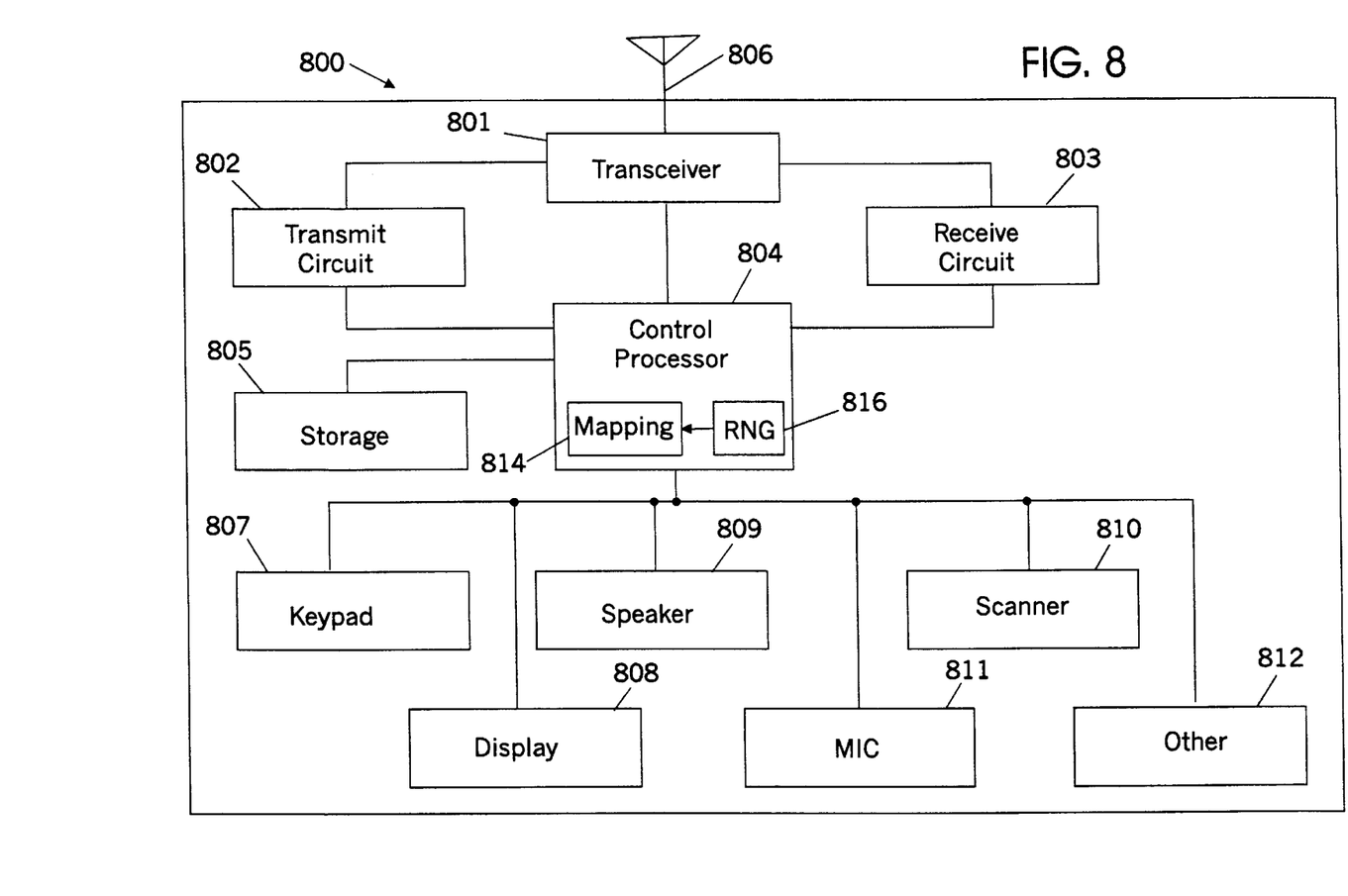
FIG. 8 is a block diagram of radiotelephones according to the present invention.

Referring now to FIG. 8, a simplified block diagram of radiotelephones according to the present invention is shown. As shown in FIG. 8, radiotelephone 800 can be a cellular telephone, a satellite telephone, or a high function terminal that provides functions in addition to those of a cellular telephone, such as facsimile, data communications, data processing, word processing, and other personal communications systems functions. These high function terminals are often referred to as Personal Communications Systems (PCS). Multiple mode wireless communication terminals that embody two or more of these functions are also included.

As shown in FIG. 8, radiotelephone 800 includes a transceiver 801 that is coupled to antenna 806. Radiotelephone 800 also includes a control processor 804 and storage (memory) 805 that is coupled to control processor 804 to provide storage capacity for program and data information. As further shown in FIG. 8, radiotelephone 800 also generally includes a user interface including a keypad 807, a display 808, a speaker 809 and a microphone 811. In order to provide a wireless communications terminal for receiving transmission of audio, video data and/or multimedia signals, keypad 807 may be a full scale personal computer keyboard, and display 808 may be a large graphics display. A scanner 810 may also be provided, as may other devices 812, such as disk drives and modems to provide a PCS terminal. Transmit circuit 802 and receive circuit 803 are also coupled to transceiver 801 and to control processor 804, to perform transmit and receive signal processing respectively.

It will be recognized that the elements of radiotelephone 800 as heretofore described are well known to those having skill in the art and need not be described further herein. Moreover, any and all of the elements of FIG. 2 may be embodied using one or more analog or digital integrated circuits, integrated circuit microprocessors that run a stored program, Application-Specific Integrated Circuits (ASIC), or any other combination of hardware and/or software.

Still referring to FIG. 8, control processor 804 includes mapping 814 and random number generation (RNG) 816 according to the present invention. It will be understood that the mapping 814 and random number generation 816 may be provided as independent elements of radiotelephone 800 and need not be included within control processor 804. It will also be understood that mapping 814 and random number generation 816 may be embodied using one or more analog or digital integrated circuits, integrated circuit microprocessors that run a stored program, ASICs, or any other combination of hardware and/or software. Accordingly, the mapping 814 and random number generation 816 may also be referred to as "circuits".

Mapping 814 maps an access request by the radiotelephone 800 for one of the radiotelephone traffic channels into a predetermined RACH slot based upon information concerning the access request by the radiotelephone. Accordingly, the RACH slot in which an access request is placed conveys additional information about the access request. Random number generation 816 may be used as part of contention-resolving protocol to generate a random number to indicate a selected frame of RACH slots to be used by the radiotelephone 800 to request access to one of the radiotelephone traffic channels. Mapping 814 is responsive to the random number generator 816 to map an access request by the radiotelephone into a predetermined one of the RACH slots in the selected frame of RACH slots indicated by the random number, based upon information concerning the access request by the radiotelephone, such that the RACH slot in which an access request is placed conveys additional information about the access request.

Figure 9:
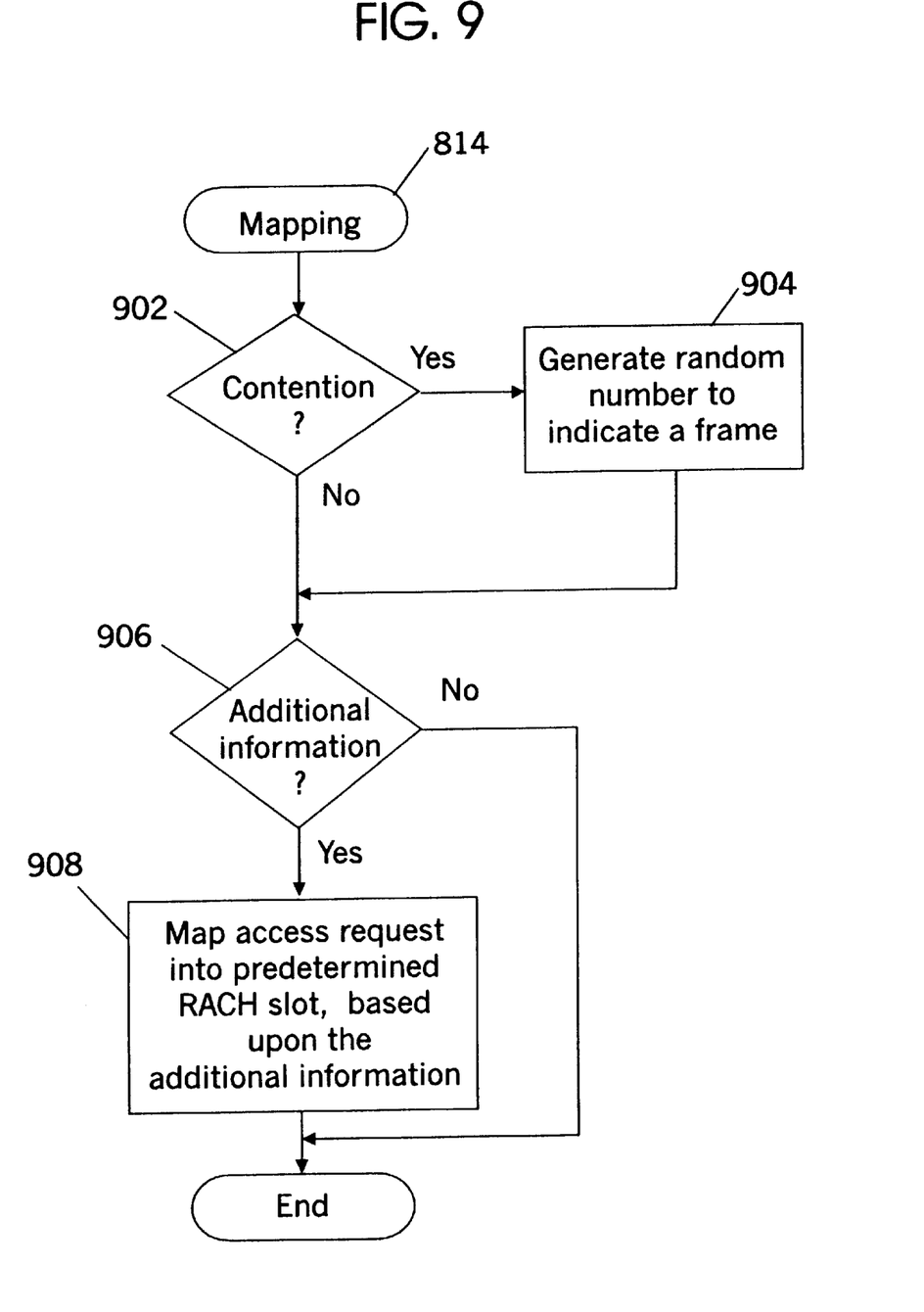
FIG. 9 is a flowchart illustrating mapping according to the present invention.

FIG. 9 illustrates mapping according to the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps such as is described in FIG. 9, or by combinations of special purpose hardware and computer instructions.

Referring now to FIG. 9, mapping according to the present invention (Block 814 of FIG. 8) will now be described. At Block 902, a test is made as to whether mapping should be made for contention-resolving. In other words, it is determined whether a previous access attempt resulted in an access failure due to multiple requests in the same RACH slot. If contention was present, then at Block 904 a random number is generated to indicate a selected frame for requesting access in a second request.

Then at Block 906, it is determined whether additional information is to be conveyed with the access request. This additional information may be, for example, an identification of a nearest gateway. It will be understood by those having skill in the art that the identification of the nearest gateway may be obtained from the satellite of FIG. 5, from the gateway of FIG. 5, from the radiotelephone itself or from other sources using techniques known to those having skill in the art. If additional information is to be conveyed, then at Block 908, the access request is mapped into a predetermined RACH slot, based upon the additional information. Decoding takes place at the base station by decoding the additional information concerning the access request, based upon identification of the RACH slot in which the access request message is received.

Accordingly, an access request by a radiotelephone for one of a plurality of radiotelephone traffic channels is mapped into a predetermined RACH slot based upon information concerning the access request by the radiotelephone, such that the RACH slot in which an access request is received conveys additional information about the access request. Thus, additional information may be transmitted within the existing RACH channel structure and protocol.

The present invention may be used to convey any amount of additional information about the access request. However, large amounts of information may increase the number of RACH frames that are used in order to map the information. This may cause delays in gaining access. Accordingly, the present invention may preferably be used when small amounts of additional information, such as a nearest gateway identification, are desired. Thus, the position of the RACH slot may be used to convey information that is not internally included in the RACH message content. Although the present invention may add delay to the transmission of the access request by the radiotelephone, the amount of delay may be negligible, particularly where the present invention is only used to convey one or two additional pieces of information. There may be no processing delay in the network control center, because the RACH mapping can be determined in parallel with RACH content processing.

Finally, it will also be understood that although mapping was described herein as being performed by the radiotelephone, it may be performed by other portions of the radiotelephone communication system, alone or in combination with the radiotelephone.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A radiotelephone communication system comprising:

a plurality of radiotelephones;

at least one base station comprising a plurality of gateways;

a plurality of radiotelephone traffic channels that are used by the radiotelephones for radiotelephone communication via the at least one base station;

a Random Access CHannel (RACH) including repeating frames of RACH slots that are used by the radiotelephones to request access to one of the radiotelephone traffic channels by placing an access request message in a RACH slot; and means for mapping an access request by a radiotelephone into a predetermined one of the RACH slots based upon a nearest gateway to the radiotelephone such that the RACH slot in which an access request is placed identifies the nearest gateway to the radiotelephone.

2. A radiotelephone communication system according to claim 1 wherein the radiotelephone communication system is a satellite radiotelephone communication system including at least one satellite.

3. A radiotelephone communication system according to claim 1 wherein the plurality of gateways is a first and a second gateway, and wherein the repeating frames of RACH slots are repeating frames of odd and even RACH slots, the means for mapping comprising:

means for mapping an access request by a radiotelephone into an odd RACH slot to indicate that the first gateway is nearest to the radiotelephone, and for mapping the access request by the radiotelephone into an even RACH slot to indicate that the second gateway is nearest to the radiotelephone.

4. A radiotelephone communication system according to claim 1 further comprising:

means for generating a random number to indicate a selected frame of RACH slots to be sued by the radiotelephone to request access to one of the radiotelephone traffic channels;

the means for mapping comprising means for mapping an access request by the radiotelephone into a predetermined one of the RACH slots in the selected frame of RACH slots indicated by the random number, based upon a nearest gateway to the radiotelephone, such that the RACH slot in which an access request is placed identifies the nearest gateway to the radiotelephone.

5. A radiotelephone communication system comprising:

a plurality of radiotelephones;

at least one base station comprising a plurality of gateways;

a plurality of radiotelephone traffic channels that are used by the radiotelephones for radiotelephone communication via the at least one base station;

a Random Access CHannel (RACH) including repeating frames of RACH slots that are used by the radiotelephones to request access to one of the radiotelephone traffic channels by placing an access request message in a RACH slot; and a circuit that maps an access request by a radiotelephone into a predetermined one of the RACH slots based upon a nearest gateway to the radiotelephone, such that the RACH slot in which an access request is placed identifies the nearest gateway to the radiotelephone.

6. A radiotelephone communication system according to claim 5 wherein the radiotelephone communication system is a satellite radiotelephone communication system including at least one satellite.

7. A radiotelephone communication system according to claim 5 wherein the plurality of gateways is a first and a second gateway, and wherein the repeating frames of RACH slots are repeating frames of odd and even RACH slots, the circuit comprising:

a circuit that maps an access request by a radiotelephone into an odd RACH slot to indicate that the first gateway is nearest to the radiotelephone, and that maps the access request by the radiotelephone into an even RACH slot to indicate that the second gateway is nearest to the radiotelephone.

8. A radiotelephone communication system according to claim 5 further comprising:

a random number generator that indicates a selected frame of RACH slots to be used by the radiotelephone to request access to one of the radiotelephone traffic channels;

the circuit comprising a circuit that maps an access request by the radiotelephone into a predetermined one of the RACH slots in the selected frame of RACH slots indicated by the random number, based upon a nearest gateway to the radiotelephone, such that the RACH slot in which an access request is placed identifies the nearest gateway to the radiotelephone.

9. An access requesting method for a radiotelephone communication system comprising a plurality of radiotelephones, at least one base station comprising a plurality of gateways, a plurality of radiotelephone traffic channels that are used by the radiotelephones for radiotelephone communication via the at least one base station, and a Random Access CHannel (RACH) including repeating frames of RACH slots that are used by the radiotelephones to request access to one of the radiotelephone traffic channels by placing an access request message in a RACH slot, the access requesting method comprising the step of:

mapping an access request by a radiotelephone into a predetermined one of the RACH slots based upon a nearest gateway to the radiotelephone, such that the RACH slot in which an access request is placed identifies the nearest gateway to the radiotelephone.

10. A method according to claim 9 wherein the radiotelephone communication system is a satellite radiotelephone communication system including at least one satellite.

11. A method according to claim 9 wherein the plurality of gateways is a first and a second gateway, and wherein the repeating frames of RACH slots are repeating frames of odd and even RACH slots, the mapping step comprising the steps of:

mapping an access request by a radiotelephone into an odd RACH slot to indicate that the first gateway is nearest to the radiotelephone; and mapping the access request by the radiotelephone into an even RACH slot to indicate that the second gateway is nearest to the radiotelephone.

12. A method according to claim 9 wherein the mapping step is preceded by the step of:

generating a random number to indicate a selected frame of RACH slots to be used by the radiotelephone to request access to one of the radiotelephone traffic channels;

the mapping step comprising the step of mapping an access request by the radiotelephone into a predetermined one of the RACH slots in the selected frame of RACH slots indicated by the random number, based upon a nearest gateway to the radiotelephone, such that the RACH slot in which an access request is placed identifies the nearest gateway to the radiotelephone.

13. A radiotelephone comprising:

means for communicating with at least one base station of a radiotelephone communication system comprising a plurality of gateways, using one of a plurality of radiotelephone traffic channels; and means for mapping an access request by the radiotelephone for one of the radiotelephone traffic channels into a predetermined Random Access CHannel (RACH) slot based upon a nearest gateway to the radiotelephone, such that the RACH slot in which an access request is placed identifies the nearest gateway to the radiotelephone.

14. A radiotelephone according to claim 13 wherein the radiotelephone communication system is a satellite radiotelephone communication system including at least one satellite.

15. A radiotelephone according to claim 13 wherein the plurality of gateways is a first and a second gateway, and wherein the RACH slots are odd and even RACH slots, the means for mapping comprising:

means for mapping an access request by a radiotelephone into an odd RACH slot to indicate that the first gateway is nearest to the radiotelephone, and for mapping the access request by the radiotelephone into an even RACH slot to indicate that the second gateway is nearest to the radiotelephone.

16. A radiotelephone according to claim 13 wherein the RACH slots are arranged in repeating frames of RACH slots, the radiotelephone further comprising:

means for generating a random number to indicate a selected frame of RACH slots to be used by the radiotelephone to request access to one of the radiotelephone traffic channels;

the means for mapping comprising means for mapping an access request by the radiotelephone into a predetermined RACH slot in the selected frame of RACH slots indicated by the random number, based upon a nearest gateway to the radiotelephone, such that the RACH slot in which an access request is placed identifies the nearest gateway to the radiotelephone.

17. A radiotelephone comprising:

a transceiver that communicates with at least one base station of a radiotelephone communication system comprising a plurality of gateways, using one of a plurality of radiotelephone traffic channels; and a circuit that maps an access request by the radiotelephone for one of the radiotelephone traffic channels into a predetermined Random Access CHannel (RACH) slot based upon a nearest gateway to the radiotelephone, such that the RACH slot in which an access request is placed identifies the nearest gateway to the radiotelephone.

18. A radiotelephone according to claim 17 wherein the radiotelephone communication system is a satellite radiotelephone communication system including at least one satellite.

19. A radiotelephone according to claim 17 wherein the plurality of gateways is a first and a second gateway, and wherein the RACH slots are odd and even RACH slots, the circuit comprising:

a circuit that maps an access request by a radiotelephone into an odd RACH slot to indicate that the first gateway is nearest to the radiotelephone, and that maps the access request by the radiotelephone into an even RACH slot to indicate that the second gateway is nearest to the radiotelephone.

20. A radiotelephone according to claim 17 wherein the RACH slots are arranged in repeating frames of RACH slots, the radiotelephone further comprising:

a random number generator that indicates a selected frame of RACH slots to be used by the radiotelephone to request access to one of the radiotelephone traffic channels;

the circuit comprising a circuit that maps an access request by the radiotelephone into a predetermined RACH slot in the selected frame of RACH slots indicated by the random number, based upon a nearest gateway to the radiotelephone, such that the RACH slot in which an access request is placed identifies the nearest gateway to the radiotelephone.

21. A method of operating a radiotelephone comprising the step of:

mapping an access request by the radiotelephone for one of a plurality of radiotelephone traffic channels of a radiotelephone communication system comprising a plurality of gateways into a predetermined Random Access CHannel (RACH) slot based upon a nearest gateway to the radiotelephone, such that the RACH slot in which an access request is placed identifies the nearest gateway to the radiotelephone.

22. A method according to claim 21 wherein the radiotelephone communication system is a satellite radiotelephone communication system including at least one satellite.

23. A method according to claim 21, wherein the plurality of gateways is a first and a second gateway, and wherein the RACH slots are odd and even RACH slots, the mapping step comprising the steps of:

mapping an access request by a radiotelephone into an odd RACH slot to indicate that the first gateway is nearest to the radiotelephone; and mapping the access request by the radiotelephone into an even RACH slot to indicate that the second gateway is nearest to the radiotelephone.

24. A method according to claim 21 wherein the RACH slots are arranged in repeating frames of RACH slots and wherein the mapping step is preceded by the step of:

generating a random number to indicate a selected frame of RACH slots to be used by the radiotelephone to request access to one of the radiotelephone traffic channels;

the mapping step comprising the step of mapping an access request by the radiotelephone into a predetermined RACH slot in the selected frame of RACH slots indicated by the random number, based upon a nearest gateway to the radiotelephone, such that the RACH slot in which an access request is placed identifies the nearest gateway to the radiotelephone.

25. A radiotelephone communication system base station that communicates with a plurality of radiotelephones, the base station comprising:

a plurality of gateways;

means for receiving a plurality of radiotelephone traffic channels that are used by the radiotelphone for radiotelephone communication with the base station;

means for receiving a Random Access CHannel (RACH) including repeating frames of RACH slots that are used by the radiotelephones to request access to one of the radiotelephone traffic channels by placing an access request message in a RACH slot; and means for decoding an identification of a nearest gateway to a radiotelephone based upon identification of the RACH slot in which the access request message is received, such that the RACH slot in which an access request is received identifies the nearest gateway to the radiotelephone.

26. A base station according to claim 25 wherein the base station is a satellite radiotelephone communication system base station.

27. A base station according to claim 25 wherein the plurality of gateways is a first and a second gateway, and wherein the repeating frames of RACH slots are repeating frames of odd and even RACH slots, the means for decoding comprising:

means for decoding an access request by a radiotelephone in an odd RACH slot to indicate that the first gateway is nearest to the radiotelephone, and for decoding the access request by the radiotelephone is an even RACH slot to indicate that the second gateway is nearest to the radiotelephone.

28. A radiotelephone communication system base station that communicates with a plurality of radiotelephones, using a plurality of radiotelephone traffic channels and a Random Access CHannel (RACH) including repeating frames of RACH slots that are used by the radiotelephones to request access to one of the radiotelephone traffic channels by placing an access request message in a RACH slot, the base station comprising:

a plurality of gateways; and a circuit that decodes an identification of a nearest gateway to a radiotelephone based upon identification of the RACH slot in which the access message is received, such that the RACH slot in which an access request is received identifies the nearest gateway to the radiotelephone.

29. A base station according to claim 28 wherein the base station is a satellite radiotelephone communication base station.

30. A base station according to claim 28 wherein the plurality of gateways is a first and a second gateway, and wherein the repeating frames of RACH slots are repeating frames of odd and even RACH slots, the circuit comprising:

a circuit that decodes an access request by a radiotelephone in an odd RACH slot to indicate that the first gateway is nearest to the radiotelephone, and that decodes the access request by the radiotelephone in an even RACH slot to indicate that the second gateway is nearest to the radiotelephone.

31. A method of operating a radiotelephone communication system base station comprising a plurality of gateways, that communicates with a plurality of radiotelephones using a plurality of radiotelephone traffic channels and a Random Access CHannel (RACH) including repeating frames of RACH slots that are used by the radiotelephone to request access to one of the radiotelephone traffic channels by placing an access request message in a RACH slot, the method comprising the step of:

decoding an identification of a nearest gateway to a radiotelephone based upon identification of the RACH slot in which the access request message is received, such that the RACH slot in which an access request is received identifies the nearest gateway to the radiotelephone.

32. A method according to claim 31 wherein the base station is a satellite radiotelephone communication system base station.

33. A method according to claim 31 wherein the plurality of gateways is a first and a second gateway, and wherein the repeating frames of RACH slots are repeating frames of odd and even RACH slots, the decoding step comprising the steps of:

decoding an access request by a radiotelephone in an odd RACH slot to indicate that the first gateway is nearest to the radiotelephone; and decoding the access request by the radiotelephone in an even RACH slot to indicate that the second gateway is nearest to the radiotelephone.

* * * * *